No. 770,779. PATENTED SEPT. 27, 1904.
D. W. PAYNE.
COMBINED PASTEURIZER, CREAM RIPENER, CHURN, AND BUTTER WORKER.
APPLICATION FILED NOV. 19, 1902. RENEWED JULY 19, 1904.
NO MODEL. 6 SHEETS—SHEET 1.

FIG. 1.

Witnesses
Inventor
Darius W. Payne
By Paul & Paul
His Attorneys

No. 770,779. PATENTED SEPT. 27, 1904.
D. W. PAYNE.
COMBINED PASTEURIZER, CREAM RIPENER, CHURN, AND BUTTER WORKER.
APPLICATION FILED NOV. 19, 1902. RENEWED JULY 19, 1904.
NO MODEL. 6 SHEETS—SHEET 2.

Witnesses
Inventor
Darius W. Payne
By Paul & Paul
His Attorneys

Inventor
Darius W Payne
By Paul & Paul
His Attorneys

Witnesses

No. 770,779. Patented September 27, 1904.

UNITED STATES PATENT OFFICE.

DARIUS W. PAYNE, OF MINNEAPOLIS, MINNESOTA.

COMBINED PASTEURIZER, CREAM-RIPENER, CHURN, AND BUTTER-WORKER.

SPECIFICATION forming part of Letters Patent No. 770,779, dated September 27, 1904.

Application filed November 19, 1902. Renewed July 19, 1904. Serial No. 217,158. (No model.)

*To all whom it may concern:*

Be it known that I, DARIUS W. PAYNE, of Minneapolis, in the county of Hennepin, State of Minnesota, have invented certain new and useful Improvements in a Combined Pasteurizer, Cream - Ripener, Churn, and Butter-Worker, of which the following is a specification.

This invention relates to improvements in machines designed for pasteurizing cream, ripening it, churning it, and thereafter salting and working the buttter; and the objects I have in view are to provide a single machine in which all of these processes can be carried out and the butter can be finished and made ready for table use. By so doing I dispense with the use of the usual cream-vat, pasteurizer, cream-ripener, and separate churn and butter-worker and combine the work of all of these machines into a single machine whose construction is as simple as that of the ordinary churn or butter-worker. This combined machine not only enables the work of several machines to be done in one, but produces a better article of butter, because the temperature of the cream is under the perfect control of the butter-maker while pasteurizing, ripening, and churning the cream into butter and because the cream and butter are kept in an air-tight receptacle during the different stages of the process. At the same time should the butter-maker desire not to make pasteurized butter the cream can be ripened and churned in the machine without pasteurizing by controlling the temperature and speed for the performance of each operation, and if for any reason the operator should desire this machine to perform the work of only one of the machines mentioned it will do it more perfectly than any one of the ordinary machines designed for such purposes alone, because in this machine the proper temperature can readily be secured and maintained.

The invention consists generally in providing a suitable jacketed drum or case mounted so as to be capable of rotation upon its axis and provided with means whereby steam or other gas or a suitable liquid may be circulated between the drum and its inclosing jacket while the machine is in operation, said drum being provided with rolls or flights by which the cream is agitated and kept in motion while the drum is being rotated.

The invention consists, further, in providing a suitable rotating drum with a series of hollow rolls and means for circulating steam or other gas or a suitable liquid through said rolls while the machine is in operation.

The invention consists, further, in providing a suitable drum with a series of stationary hollow flights with means for circulating steam or other gas or a suitable liquid through said flights while the machine is in operation.

The invention consists, further, in the constructions and combinations hereinafter described, and particularly pointed out in the claims.

In the accompanying drawings, forming part of this specification.

Figure 1:
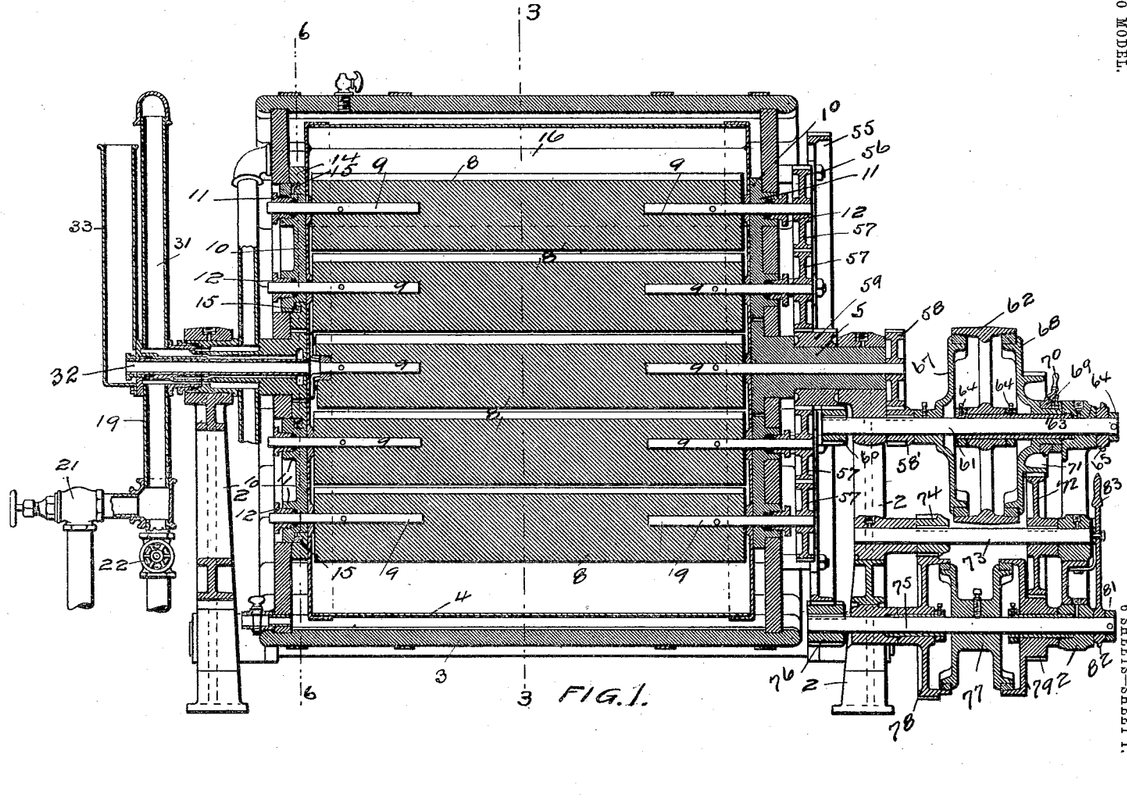
Figure 1 is a longitudinal vertical section of a machine embodying my invention.
Figure 3:
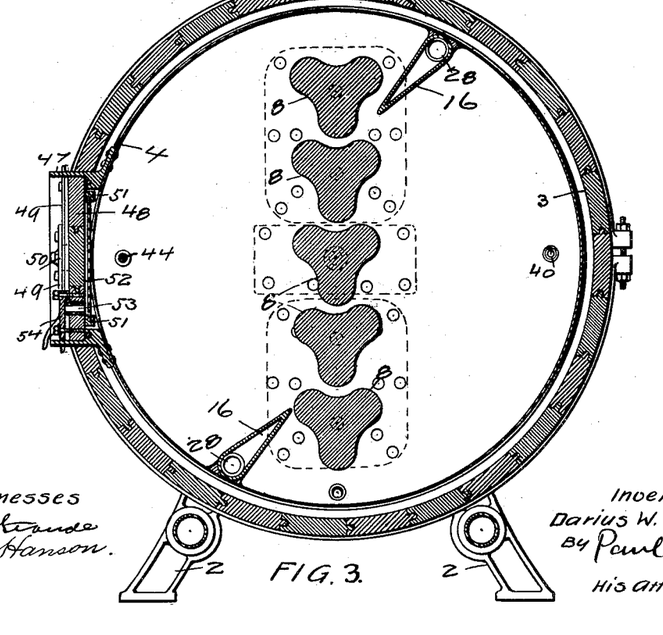
Fig. 3 is a transverse vertical section on line 3 3 of Fig. 1.
Figure 4:
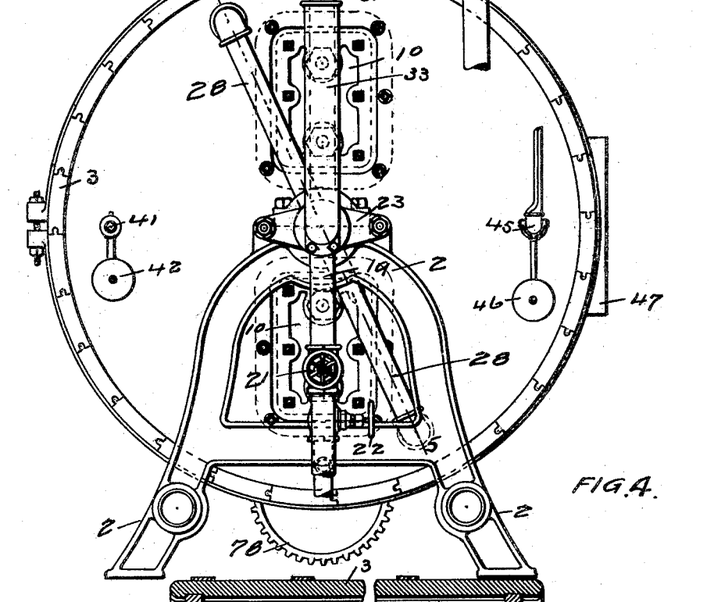
Fig. 4 is an elevation of the left-hand end of the machine shown in Fig. 1.
Figure 5:
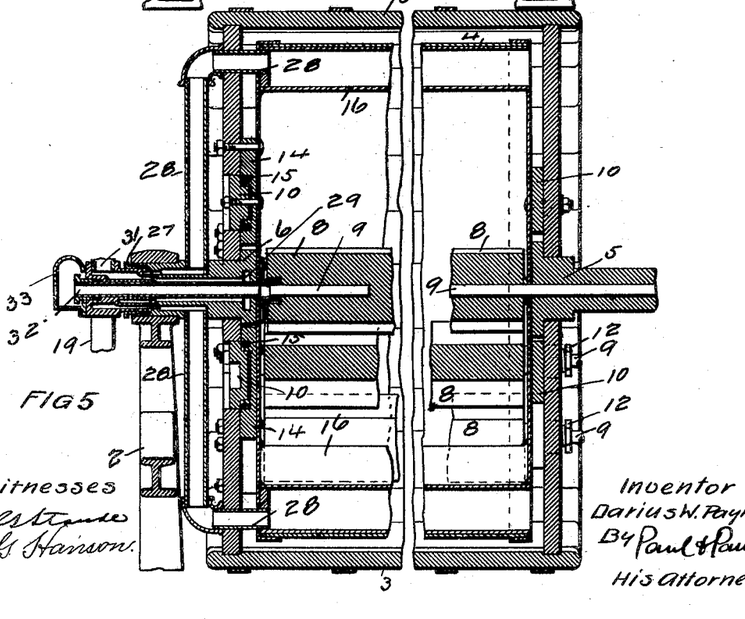
Fig. 5 is a longitudinal section, partly broken away, the section being taken on line 5 5 of Fig. 4.
Figure 6:
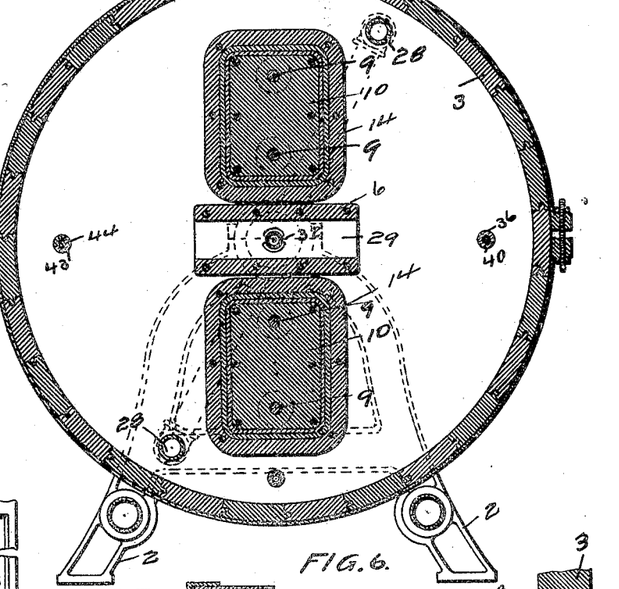
Fig. 6 is a section on line 6 6 of Fig. 1.
Figure 7:
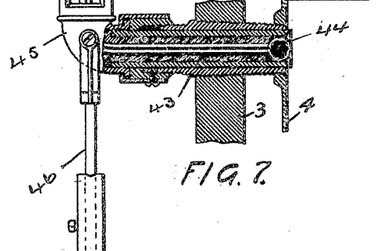
Fig. 7 is a detail showing the manner of securing a thermometer in the end of the drum and permitting the same to stand in a vertical position while the drum is being rotated.
Figure 9:
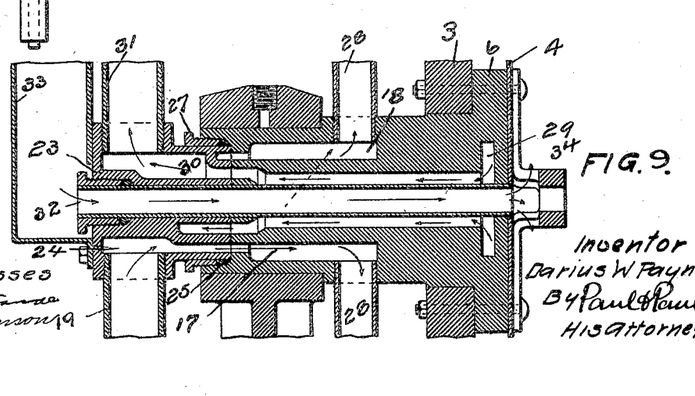
Fig. 9 is a detailed section showing the manner of connecting the steam or water supply and exhaust-pipes and also the cream-pipe to the drum.
Figure 17:
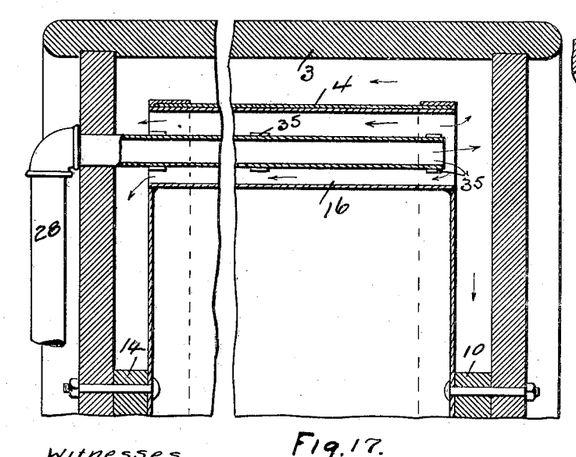
Figs. 17 and 18 are details of portions of the drum.
Figure 18:
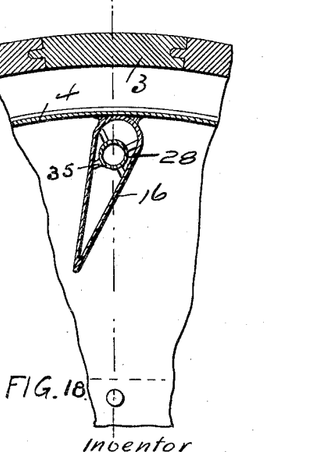

In the drawings, 2 2 represent suitable standards which are suitably connected together and which are provided with suitable bearings for the gudgeons of the rotating drum. The drum is constructed of two cylinders or receptacles 3 and 4, arranged one within the other and having a suitable steam and water space between them. The outer jacket 3 of the drum is preferably constructed of wood, while the inner cylinder 4 is preferably formed of metal. These cylinders may be of any suitable size and construction, and this double-walled drum is provided at each end with a suitable journal or gudgeon mounted in bearings in the standards 2, so as to be capable of rotating freely therein. Mounted in suitable bearings in the ends of the double drum are the butter-working rolls 8. As here shown, there are preferably five of these rolls, (see Fig. 3,) and the rolls are preferably fluted longitudinally and arranged so that the rib or projection of one roll comes opposite the groove or depression in the next adjacent roll. The rolls 8 are preferably provided with suitable journals or gudgeons 9, that are mounted in the bearings in the opposite ends of the drum. For the purpose of forming a solid bearing for the gudgeons of each roll I prefer to provide the blocks or plates 10, which are arranged between the inner and outer cylinders and which are preferably provided with suitable hubs 11, that extend through one head of the outer drum and are provided with the adjustable threaded stuffing-boxes 12. At the opposite end of the drum the plates 10 are arranged in recesses in the drumhead and are also provided with projections 11 and stuffing-boxes 12, by means of which the roll-shafts are supported and tight joints are secured. The plates 10, which are arranged between the heads of the cylinders, are shown in detail in Fig. 6 of the drawings. These plates at one end are surrounded by a rectangular frame 14, and a suitable packing 15 is arranged between the plate 10 and the frame 14. (See Fig. 1.) I prefer, however, to provide a hollow flight 16, preferably made of sheet metal and arranged within the drum and parallel with and in close proximity to the butter-working roll that is nearest to the drum at each side. (See Fig. 3.) These flights, which are preferably hollow throughout their entire length, are connected at one end to the steam and water space between the two cylinders of the drum and at the other end connected to suitable pipes that lead into said flights and conduct water thereto. (See Figs. 1 and 3.) I provide means by which steam or other gas or water, or both, may be circulated through the space between the two walls of the drum. The preferable means used for this purpose is shown clearly in Fig. 9 of the drawings. As here shown, the gudgeon 6 is hollow, being provided with two annular openings 17 and 18. An inlet-pipe 19, provided with valves 21 and 22, is connected through a suitable stationary sleeve or coupling 24 with the annular opening 17. A suitable packing 25 surrounds the sleeve 24 within the gudgeon 6 and is held in position by means of the annular packing-ring 27. From the annular opening 17 communication is made, through the pipes 28, with the interior of the drum. As here shown, these pipes extend in radial directions and are connected to the head of the drum near the circumference thereof. These pipes may communicate directly through the head of the drum with the space between the two cylinders. I prefer, however, to extend the pipes 28 across the space between the heads of the drums and to connect them with the ends of the flights 16. (See Fig. 3.) The opposite ends of these flights connect with the space between the heads of the drums, so that the fluid that passes through the pipes 28 and through the flights 16 enters the space between the cylinders at the opposite end of the drum and then flows backward between the two drums to the end to which the pipes 28 are connected. The space between the two drums at this end is entirely open, except for the plates 10 and the surrounding frames 14, as shown in Fig. 6. The gudgeon 6 at this end is provided with lateral openings 29, communicating with the annular space 18 within said gudgeon. This space communicates with an exit-opening 30 in the stationary sleeve 23, and this opening communicates with an exit-pipe 31. By this means steam, water, or other fluid is passed into the space between the two drums and circulating therein passes out through the hollow gudgeon 6 into the exit-pipe 31. When the pipes 28 are connected to the hollow flights, the fluid must first pass through said flights before it enters the space between the cylinders. By means of the valves 21 and 22 the amount of water and the amount of steam that is admitted to the space between the drums may be regulated, and hence the temperature of the inner drum and of the cream therein may be accurately regulated. If preferred, the cream may be admitted through a centrally-located pipe 32, arranged in the hollow gudgeon 6 and having a supply-pipe 33 connected thereto. (See Fig. 9.) The pipe 32 may, however, be omitted, and the cream may be put into the drum by any suitable means. When the pipe 32 is employed and the drum is also provided with five rolls, one centrally located, as shown in Fig. 1 of the drawings, the gudgeon 9 at one end of the center roll has its bearing in a bracket 34 secured to the inside of the head of the drum, so as not to interfere with passage of cream into the drum through the pipe 32. (See Fig. 9.) If preferred, the flight 16 may be open at both ends, as shown in Figs. 17 and 18 of the drawings, and the pipe 28 will in this case extend directly through the flight 16 and have its open end substantially coincident with the open end of the flight. In this case the flight itself may be braced and strengthened by a series of braces 35, secured to the outside of the pipe and to the inside of the flight, as shown in Fig. 18. With this construction the fluid that passes through the pipe 28 will travel in this pipe the full length of the drum and will be discharged into the space between the ends of the two drums. It will then flow back partly through the open flight 16 and partly around the drum to the end of the drum at which the pipe 28 is located. By this means direct contact between the fluid as it enters the drum and the flight 16 is avoided, and thereby the excessive heating of the flight 16 and the danger of scorching the cream will also be avoided.

Figure 10:
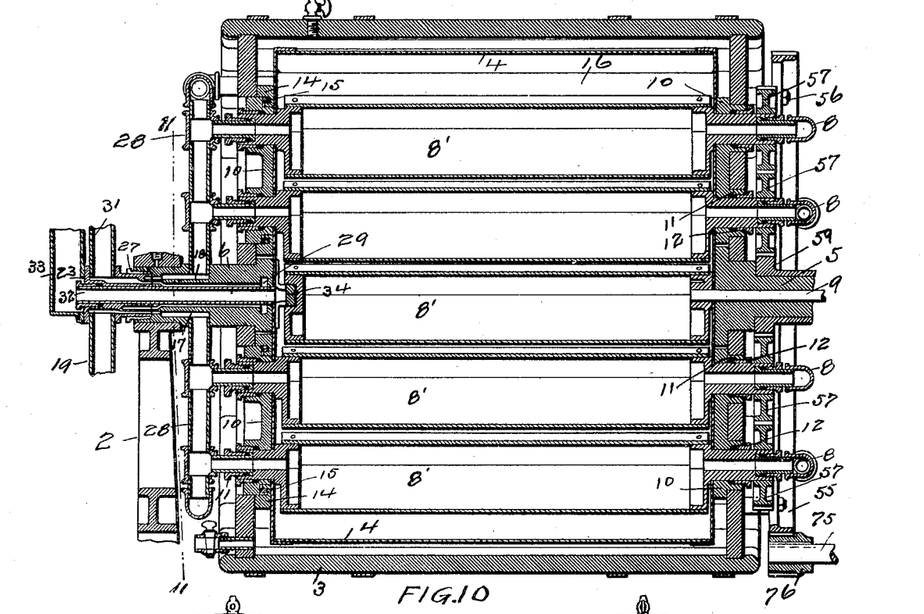
Fig. 10 is a longitudinal vertical section of a drum of the same construction as that shown in the other figures, but having hollow rolls arranged therein and means for circulating the steam and water through the hollow rolls.
Figure 11:
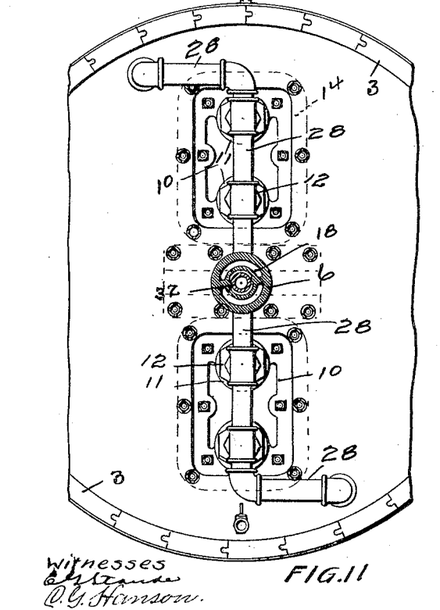
Fig. 11 is a section on line 11 11 of Fig. 10.
Figure 12:
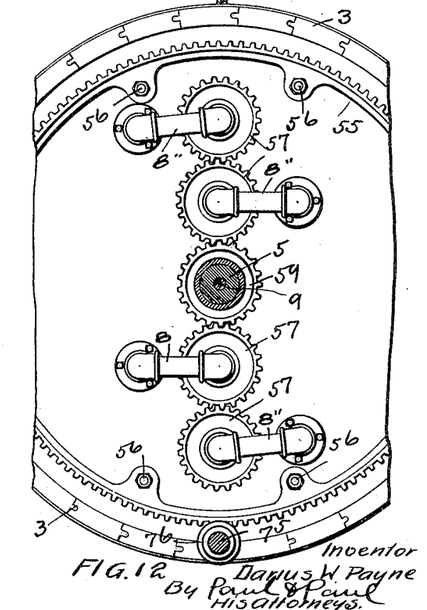
Fig. 12 is an elevation looking at the right-hand end of Fig. 10.
Figure 13:
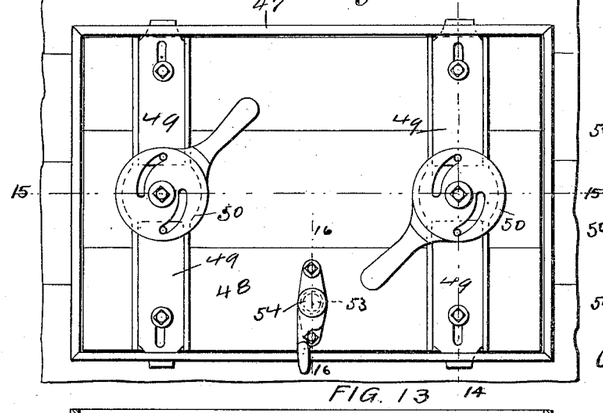
Fig. 13 is an elevation of the door that I prefer to use on the drum.
Figure 14:
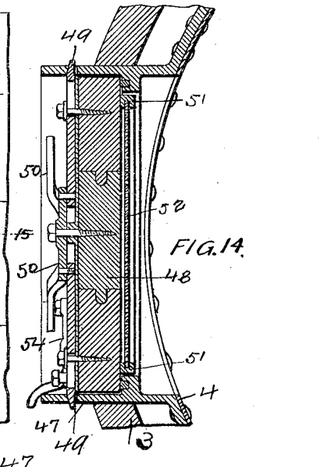
Fig. 14 is a section on line 14 14 of Fig. 13.
Figure 15:
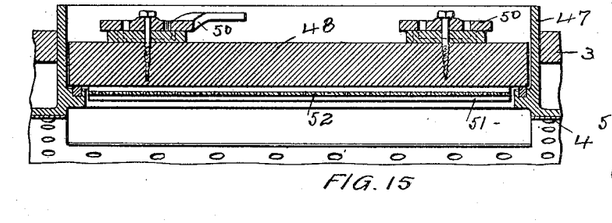
Fig. 15 is a section on line 15 15 of Fig. 13.
Figure 16:
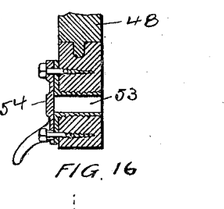
Fig. 16 is a section on line 16 16 of Fig. 13.

In some instances I may provide the drum with hollow rolls 8' (see Fig. 10) instead of the solid rolls already described. When the hollow rolls are employed, connections are made, as shown in Fig. 10, between the pipes 28 and the hollow journals of said rolls, and at the opposite end of the drum the hollow journal of each roll is connected by a pipe 8'' with the space between the ends of the two cylinders forming the drum. (See Figs. 10 and 12.) With this construction the fluid will be circulated through the rolls as well as through the flights and the space between the two cylinders. It will not be necessary to provide means for circulating fluid through the center roll. While I prefer to use five rolls arranged as shown, the center roll may be omitted without any change in construction of the other parts of the machine. I prefer also to provide an automatic vent for the drum, which will permit the gases to escape as the drum is rotated without permitting any of the liquid to escape from the drum.

Figure 8:
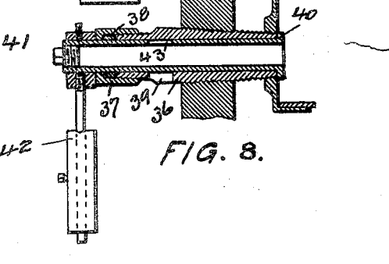
Fig. 8 is a detail of the automatic vent for the machine.

The construction of this device is shown in Fig. 8 of the drawings, in which 36 is a threaded bushing that extends through the heads of both cylinders and is provided from the outside of the drum with a threaded cap 37 and a suitable packing 38 and with an opening 39. A tube 40 is arranged within this bushing, being secured in position by a flange upon its inner end, and its outer end is closed by a plug 41. A weighted arm 42 is secured to the outer end of this tube. The tube 40 is provided upon one side with an opening 43, adapted to register with the opening 39 in the bushing 36 when the bushing is at or near the highest point of its travel in the rotation of the drum. The weighted arm 42 remains at all times in a perpendicular position, and the tube 40 is therefore compelled to turn in the bushing. When the bushing approaches the top of the drum, the openings 43 and 39 register, and gases in the drum are permitted to escape through these openings. As the drum is never entirely full of liquid, none of the liquid can escape through the tube when the openings register with each other. As soon as the bushing is carried the desired distance beyond the highest point in its travel the opening will be closed, and none of the liquid can then escape through the tube and bushing. I also prefer to provide at the end of the drum a thermometer that remains at all times in a perpendicular position. For this purpose I secure a bushing 43 in the end of the drum, passing through the heads of both cylinders, and within this I arrange in a suitable packing a thermometer-tube 44, the outer portion of which is at right angles to the pipe which passes through the wall of the drum. This thermometer is inclosed in a suitable casing 45, to which is secured a weighted arm 46. This arm remains at all times in a vertical position, and hence the outer portion of the thermometer is also held at all times in a vertical position. I also prefer to provide means whereby the buttermilk may be drained out of the drum through the door. As here shown, the drum is provided with a suitable opening having arranged therein a frame 47, adapted to receive the door 48 and which is secured in position in the frame by means of the sliding bolts 49 and cams 50. Upon the inside of this door I arrange the grooved cleats 51, adapted to receive a suitable screen 52. An opening 53 is provided near one edge of the door, and a pivoted plate 54 is arranged to close this opening. When it is desired to drain the buttermilk from the drum, the screen 52 being in position, the drum is turned so as to bring the edge of the door having the opening 53 near to the floor and the plate 54 is turned so as to uncover the opening 53, and the buttermilk will then flow out, passing through the screen 52 and through the opening 53. The screen will prevent the passage of any of the butter through the opening.

Figure 2:
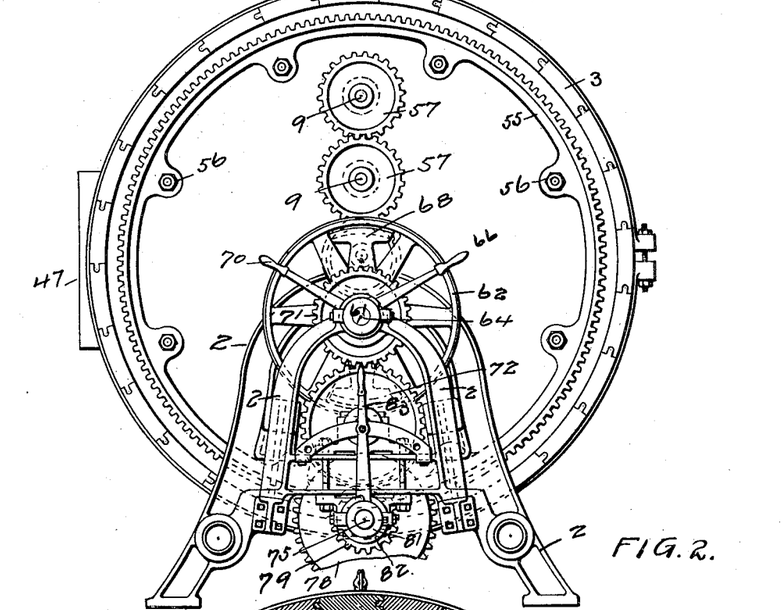
Fig. 2 is an end elevation of the same, the view being taken from the right-hand end of Fig. 1 and showing the driving mechanism.

I provide means whereby the drum may be driven at two different speeds and also provide means whereby the rolls may be rotated either while the drum is stationary or while it is being rotated at either speed. The construction that I employ for this purpose is shown in Figs. 1 and 2 of the drawings. As here shown, one end of the drum is provided with a ring gear 55, secured to the drum by any suitable means. I have here shown the gear so secured by means of bolts 56. The gudgeon 9 of each roll except the center is provided with a pinion 57, the pinions of each pair of rolls being in mesh with each other and all of said pinions being of the same size. The gudgeon of the center roll, which extends through the gudgeon 5 of the drum, is provided with a pinion 58. Mounted loosely upon the gudgeon 5 is a pinion 59. This pinion has a wide face, and two of the pinions 57 are in engagement with it. A pinion 60 upon the shaft 61 is also in mesh with the pinion 59. The shaft 61 is mounted in suitable bearings in the frame 2, and it has mounted upon it the driving-pulley 62. This pulley is loose upon the shaft. As here shown it is arranged upon a sleeve 63 between collars 64 and turns freely upon said shaft. It may of course, if preferred, be mounted directly upon the shaft. The shaft 61 is adapted to slide longitudinally a short distance in its bearings, and it is provided upon its outer end with a collar 64, and a rotating cam 65, having an operating-handle 66, is arranged between the collar 64 and the end of the shaft-bearing. By rotating this cam the shaft may be moved longitudinally in its bearings. Secured upon the shaft 61 is a clutch member 67, adapted to be brought into engagement with the driving-pulley 62. When the clutch is brought into engagement with said driving-pulley, the clutch member, the shaft 61, and the pinion 60 are caused to rotate with the driving-pulley, and thereby the rolls are rotated upon their axes. The shaft 61 is also provided with a pinion 58', that meshes with the pinion 58 upon the shaft or gudgeon of the center roll. This causes the center roll to be driven simultaneously with the other rolls and at the same speed. Upon the opposite side of the driving-pulley 62 is a clutch member 68, mounted loosely upon the shaft 61 or upon the sleeve 63 when said sleeve is employed. A rotating cam 69, provided with a handle 70, is arranged in connection with this clutch member and is adapted to move the clutch member into engagement with the driving-pulley 62. This clutch member has formed integrally with it a gear 71, which is in engagement with a pinion 72 upon a counter-shaft 73. The shaft 73 has also secured to it a pinion 74. Mounted in bearings in the frame of the machine is a second counter-shaft 75, carrying a pinion 76, that is in mesh with the ring gear 55 upon the end of the drum. A clutch-hub 77 is also secured upon this shaft, so as to rotate therewith. A clutch member 78, having gear-teeth upon its circumference, is mounted loosely upon the shaft 75, with its gear-teeth in mesh with the teeth of the pinion 74, and a clutch member 79, having a hub with gear-teeth upon the circumference thereof, is mounted loosely upon the shaft 75 at the opposite side of the hub 77, and the gear-teeth upon this clutch member are in engagement with the pinion 72 upon the shaft 73. The shaft 75 is capable of slight longitudinal movement, and it is provided with a collar 81, between which and the shaft-bearing there is arranged a rotating cam 82, having a handle 83. When this cam is moved in one direction, the clutch member 78 is brought into engagement with the hub 77 and the clutch member 79 is brought out of engagement with said hub. When it is moved in the opposite direction, the clutch member 79 is brought into engagement with the hub 77 and the member 78 is brought out of engagement with said hub. By this means the drum may be rotated either at a fast or slow speed, or by turning the lever 83 to a central position the drum will become stationary while the driving-pulley 62 is still being rotated. This driving mechanism is especially advantageous for this machine. In the pasteurizing of cream it is necessary to provide means whereby the cream may be agitated while it is being subjected to an increased temperature, as such agitation prevents the cream from being scorched and brings all the portions of the body of cream into contact with the heated cylinder, and thus raises the entire body of cream to an even temperature.

The operation of the machine will be readily understood from the foregoing detailed description of its construction. This machine takes the place in a creamery of a pasteurizer, a cooler, a vat, a cream-ripener, a churn, and a butter-worker, performing all of the functions of these six machines.

The cream when it is brought into the creamery or when it is separated by means of the usual separator may be placed directly in the drum of my machine. If it is desired to pasteurize it, steam or hot air or hot water may be passed through the space between the two cylinders, and where the hollow flights and rolls, or either, are used, it may also be passed through such flights or rolls. By this means the cream may be raised to a temperature of from $140°$ to $190°$. At the same time the cylinder is rotated and the rolls may be turned upon their axes, and by this means the cream will be constantly agitated and kept in motion in the cylinder and prevented from remaining too long in contact with the surface of the drum, and thus any scorching of the cream is prevented. When the cream has been sufficiently pasteurized, the steam or hot air is shut off, and cold water is passed through the space between the cylinder and through the hollow flights and rolls when such flights and rolls are employed, and thereby the cream is quickly reduced in temperature. By the means described the cream may be kept at the right temperature for ripening, and when it has been sufficiently ripened the churning process is begun and the cream is kept at the exact temperature desired for churning. The temperature at all times is shown by the thermometer in the end of the drum. When the churning process is complete, the buttermilk is drawn out of the drum, and at this time cold water is preferably circulated through the drum and through the hollow flights and rolls when such flights and rolls are employed and the butter is reduced to the proper temperature for working. By rotation of the drum and rotation of the rolls upon their axes the butter is successively passed between the rolls, and is thereby worked.

By employing this machine I dispense with several other machines in a creamery, economize thereby in the handling of the cream and butter, prevent contamination of the cream or butter by dust, foul air, and flies, and keep the cream and butter at all times at the desired temperature. By using one machine in place of several I economize in power and the space required in a creamery.

I do not in this application claim the combination, with a rotatable drum, of a series of hollow rolls arranged within said drum, means for rotating said rolls, and means for passing liquid, steam, or other circulating medium through said rolls, as I have claimed the same in a former application, Serial No. 47,410, filed February 10, 1901, renewed August 4, 1902, Serial No. 118,348.

I claim as my invention—

1. The combination, with a rotatable drum formed of inner and outer cylinders or casings and inner and outer heads arranged with a space between them, of bearing blocks or plates arranged between said heads, rolls arranged within said drum and rotatably mounted in said bearing blocks or plates, means for rotating said drum, and means for circulating air, steam, water or other fluid within the space between the casings forming said drum.

2. The combination, with a rotatable drum formed of inner and outer cylinders or casings and inner and outer heads arranged with a space between them, of rolls arranged within said drum and provided with gudgeons extending through said inner and outer heads, means for rotating said drum, and means for circulating air, steam, water or other fluid within the space between the casings forming said drum.

3. The combination, with a rotatable drum formed of inner and outer cylinders or casings and inner and outer heads arranged with a space between them, of bearing blocks or plates arranged between said heads, rolls arranged within said drum and provided with gudgeons mounted in said bearing blocks or plates, one or more hollow flights passing through said drum from end to end and communicating with the space between said casings, means for rotating said drum, and means for circulating air, steam, water or other fluid through said flights and within the space between the casings forming said drum.

4. The combination, with a rotatable drum formed of an inner metallic cylinder or casing and metallic heads and an outer wooden cylinder or casing provided with wooden heads, said cylinders or casings being arranged with a space between them, of bearing blocks or plates arranged between said heads, rolls arranged within said drum and having their journals passing through said heads and mounted in said blocks or plates, means for rotating said drum, and means for circulating air, steam, water or other fluid within the space between the casings forming said drum.

5. The combination, with a rotatable drum formed of inner and outer cylinders or casings and inner and outer heads arranged with a space between them and a hollow gudgeon provided on said drum on one end thereof with inlet and outlet openings through said gudgeon communicating with the space between said drums, bearing blocks or plates arranged between said heads, rolls arranged within said drum and provided with gudgeons or journals mounted in said blocks or plates, and means for passing air, steam, water or other fluid into the space between said drums through said inlet-opening and removing it from the space between said drums through said exit-opening.

6. The combination, with a rotatable drum formed of inner and outer cylinders or casings and inner and outer heads arranged with a space between them and with a hollow gudgeon at one end of the drum provided with inlet and outlet openings communicating with the space between said drums, of hollow flights arranged within said drum and communicating with the space between said casings, rolls arranged within said drum and provided with journals or gudgeons extending through said heads.

7. The combination, with the rotatable drum provided with a door-opening having a casing 47, of a door arranged to close said opening and provided with an adjustable screen 52, and a drain-opening extending through said door, substantially as described.

8. The combination, with the rotatable drum, of the series of rolls arranged therein, gudgeons for said rolls mounted in bearings in the heads of the drum, pinions 57 upon said gudgeons, a pinion 59 mounted loosely upon the drum-gudgeon and meshing with one or more of the pinions 57, a clutch, and means for driving the pinion upon the drum-gudgeon at will, substantially as described.

9. The combination, with the rotatable drum provided with a series of rolls having their gudgeons mounted in bearings in the heads of the drum, a pinion 57 upon said gudgeons, a center roll-gudgeon provided with a pinion 58, a shaft 61 having a pinion 60 in engagement with the pinion upon the drum-gudgeon and a suitable clutch upon said shaft 61.

10. The combination, with the rotatable drum provided with a series of rolls having their gudgeons mounted in bearings in the drum-heads, pinions upon said gudgeons, a center pinion in engagement with two of the roll-gudgeons, a shaft 61 provided with a pinion 60 engaging said center pinion, a loose driving-pulley 62, and a clutch upon said shaft for engaging said driving-pulley, substantially as described.

11. The combination, with the rotatable drum having a ring gear upon its end, of the longitudinally-movable shaft 75 having a pinion engaging said gear, a hub 77 fixed upon said shaft, clutch members 78 and 79 with either of which said hub may be engaged by the longitudinal movement of said shaft, and means for driving said clutch members at unequal rates of speed.

12. The combination, with a rotatable drum, of a fluted butter-working roll centrally located in said drum and mounted in the heads thereof, and two pairs of fluted butter-working rolls also arranged in said drum and mounted in the heads thereof and located upon opposite sides of said central roll.

In witness whereof I have hereunto set my hand this 10th day of November, 1902.

DARIUS W. PAYNE.

In presence of—
C. G. HANSON,
M. C. NOONAN.